No. 724,305. PATENTED MAR. 31, 1903.
F. MacFARLAND.
EXTERMINATOR.
APPLICATION FILED MAR. 31, 1902. RENEWED FEB. 17, 1903.
NO MODEL. 2 SHEETS—SHEET 1.
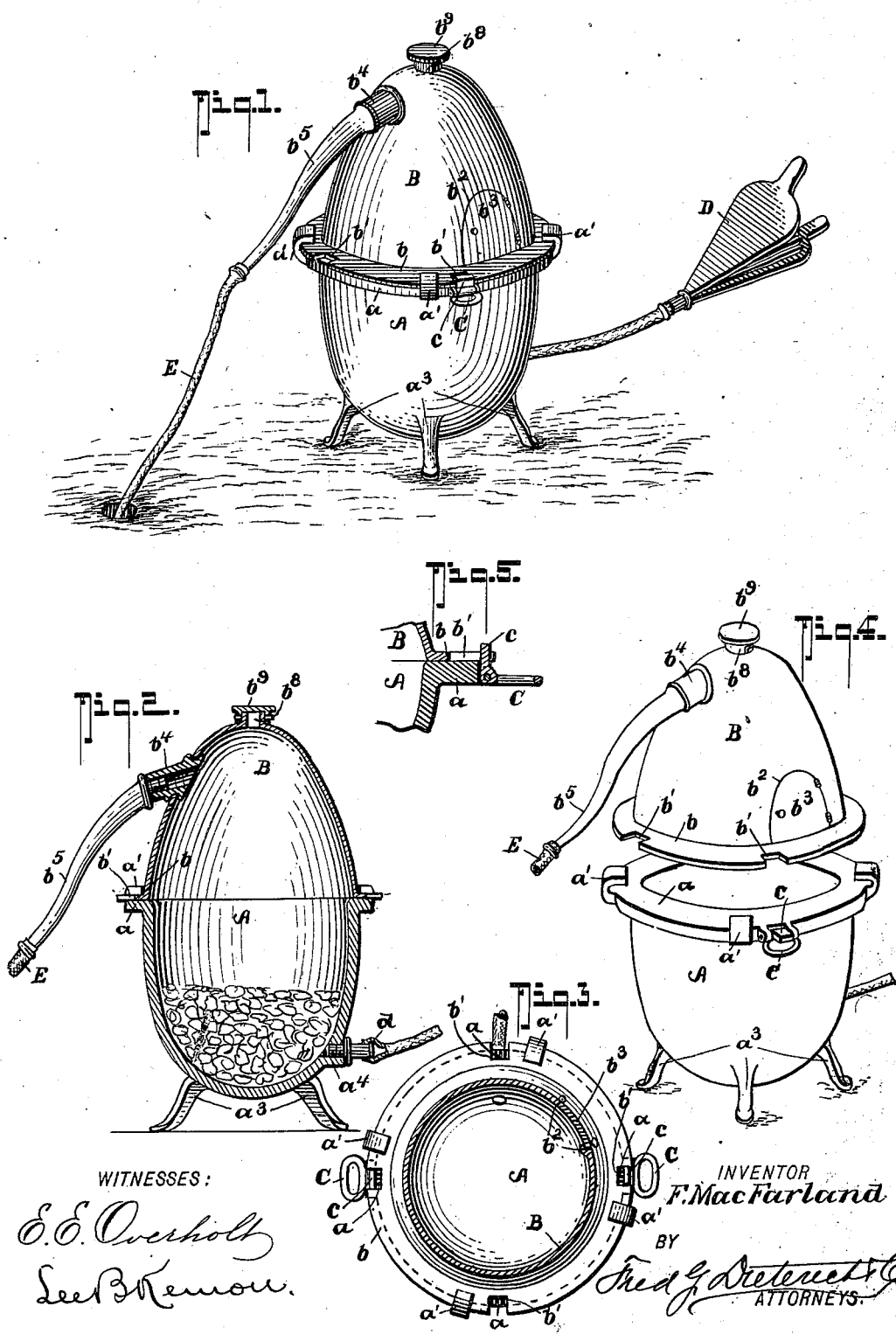

No. 724,305. PATENTED MAR. 31, 1903.
F. MacFARLAND.
EXTERMINATOR.
APPLICATION FILED MAR. 31, 1902. RENEWED FEB. 17, 1903.
NO MODEL. 2 SHEETS—SHEET 2.
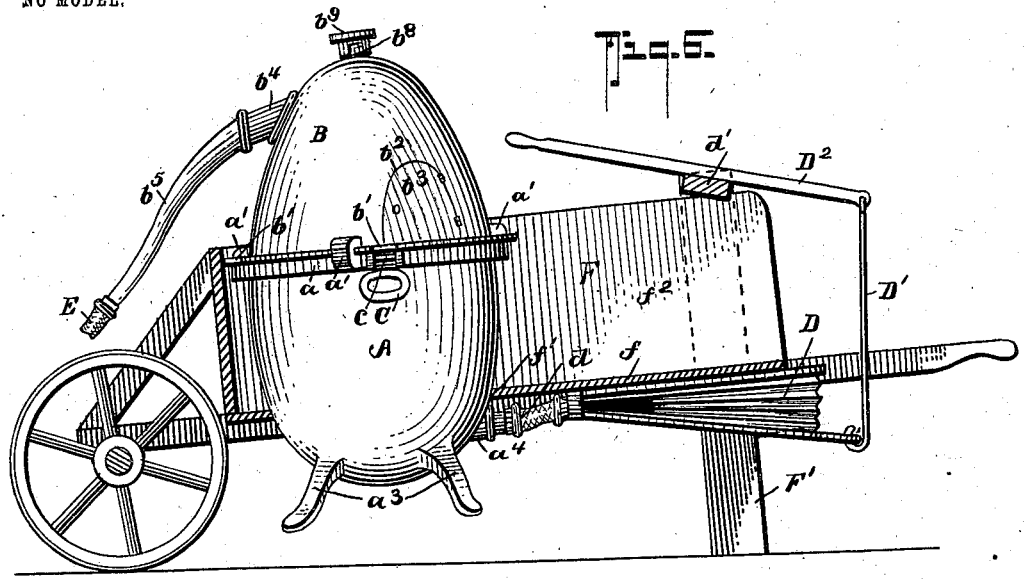
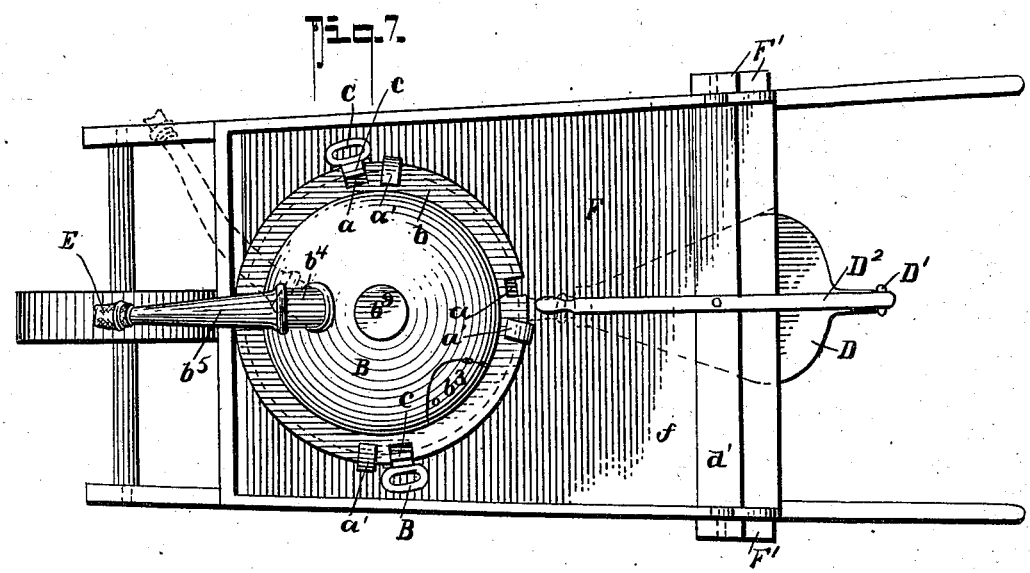
WITNESSES:
E. E. Overholt
Lee B. Kenou.
INVENTOR
F. MacFarland
BY
Fred G. Dieterich & Co.
ATTORNEYS.

UNITED STATES PATENT OFFICE.

FREDRICK MacFARLAND, OF MERIDEN, KANSAS.

EXTERMINATOR.

SPECIFICATION forming part of Letters Patent No. 724,305, dated March 31, 1903.

Application filed March 31, 1902. Renewed February 17, 1903. Serial No. 143,876. (No model.)

*To all whom it may concern:*

Be it known that I, FREDRICK MACFARLAND, residing at Meriden, in the county of Jefferson and State of Kansas, have invented a new and Improved Exterminator, of which the following is a specification.

My invention seeks to provide a very simple, inexpensive, and easily-manipulated appliance especially adapted for the extermination of prairie-dogs, gophers, rats, and other animals or rodents that burrow under the earth and which is also capable of being effectively used for destroying microbes and germs that generate in sewers; and in its generic nature my invention comprehends a portable body formed of an upper and a lower section having means for quickly and effectively joining them together, said sections having a coöperative arrangement whereby the lower will serve as a fire-box, the upper as a gas-collector, the upper section having a specially-projected nozzle or offtake and the lower a blower attachment.

In its more specific nature my invention consists in certain novel details of construction and peculiar combination of parts, all of which will hereinafter be fully explained, and pointed out in the claims, reference being had to the accompanying drawings, in which—

Figure 1 is a perspective view illustrating my invention set up for use. Fig. 2 is a vertical section of the same. Fig. 3 is a horizontal section, and Fig. 4 is a view illustrating the two-part casing or holder separated. Fig. 5 is a detail view hereinafter referred to. Fig. 6 is a side elevation, parts being in section, illustrating my invention as mounted on a wheelbarrow or portable support. Fig. 7 is a plan view of the construction shown in Fig. 6.

In its practical construction my invention embodies a holder or casing of suitable form, preferably egg shape, and comprises a lower section A, of cast metal, and an upper section B, of sheet metal. The two members A and B have opposing horizontal flanges (designated by $a$ and $b$) adapted to snugly seat against each other, and to provide for securely holding the upper member upon the lower and also for conveniently detaching the same when desired the flange $a$ on the lower section A has turned lips $a'$ and the upper flange $b$ has notches $b'$, whereby the said flange $b$ can be quickly seated on the flange $a$, and by a slight turn of member B the two flanges will be interlocked. The lower section A is also provided with handles C C, disposed at diametrically opposite sides, pivotally hung, and each of said handles has a projection $c\ c$, adapted to coöperate with the two flanges $a$ and $b$ when they (the handles) are swung up to a horizontal plane during carrying the apparatus from place to place, such arrangement of parts providing for positively holding the two parts A B from becoming disconnected in handling. The section A in practice is cast with legs $a^3$, and at its bottom it has a nipple $a^4$, the outer end of which is suitably formed to detachably hold the discharge-nozzle $d$ of a blower or bellows D. The upper sheet member B has an opening $b^2$ cut from the bottom or flange part upward and provided with a hinged door $b^3$, and at the upper or dome end the member B has an offtake $b^4$, that terminates in a tapered and elongated nozzle $b^5$, the outer end of which is bulbed to receive a hose E when it is desired to eject the fumes from the gas-generating body at some distance therefrom.

To facilitate the use of the apparatus, the offtake $b^4$ preferably has a swiveled and an air-tight joint with the dome portion of part B, so it can be turned to the directions desired and to hold the offtake to different adjustments. The connection thereof with the dome-like body includes means in the nature of opposing corrugated surfaces, the joining of which is made sufficiently snug that the spring of the metal will tend to hold the offtake-clamp to the different positions to which it may be set, as clearly shown in Fig. 5.

The dome or member B may be provided with additional outlets in its upper end (see, for example, $b^8$) and which when not connected with the hose or pipe connection are closed by screw-caps $b^9$, as shown.

From the foregoing description, taken in connection with the accompanying drawings, it is thought the advantages of my invention will be readily apparent. In the use thereof the fumigating or germicidal chemicals are deposited within the generator or body A B upon a fire-surface of wood or other combustible material, the fire being quickly started and maintained by the bellows D. The fumes generated collect in the dome of the member B and pass out into the offtake pipe or nozzle, from which they are ejected at any distance from the generator-body A B by proper manipulation of the hose when it is used or the offtake member when it is desired to eject the fumes into walls, crevices, beds, &c.

I am aware that exterminators comprising a hollow receptacle having a fire-pot and a collecting-chamber have heretofore been provided; but my invention, so far as I know, differentiates from what has heretofore been provided in this art in the peculiar and novel correlation of the several parts, particularly the means for detachably joining and interlocking the flanges of the two parts A and B, the coöperating adjustable offtake, and the combined arrangement of the entire construction.

The apparatus is very simple, cheap, and durable and in practice is provided to be very well adapted for the purposes for which it is intended.

In Figs. 6 and 7 I have illustrated my apparatus as mounted upon a portable support, such as a wheelbarrow, and when thus supported the bellows D is secured to the under side of the barrel-board $f$ and the said bellows is operated by a lever $D^2$, mounted upon a cross-bar $d'$, rockably supported on the frame of the wheel-barrow F.

Having thus described my invention, what I claim, and desire to secure by Letters Patent, is—

1. The combination with a member A, having a blow-opening at the lower end, and a horizontal flange at the upper end; of the top member B, having a dome portion and a horizontal flange for opposing the other flange, the two flanges having means for interlocking when turned relatively to each other, the top member B having a feed-inlet $b^2$, provided with a door $b^3$, the upper member having an offtake in the dome portion, all being arranged substantially as shown and for the purposes described.

2. The combination with the bottom member A, having an air-inlet at the lower end, and a horizontal flange $a$, at the upper end, having inturned lips, the member B, having a flange $b$ to seat in the flange $a$, said flange $b$, having notched portions, the said member having an offtake in its upper end, and a door-equipped feed-opening, and the handles pivotally hung on the member A, said handles having projections adapted to interlock with the flanges of the two members A and B, when turned to a horizontal plane, substantially as shown and for the purposes described.

3. The hereinbefore-described improvement in fumigating and disinfecting appliances of the character stated, comprising a receptacle consisting of a bottom section A, having an air-inlet at the lower end, provided with a nipple for attaching a blower, and having a horizontal flange, provided with inturned fingers, and pivotally-hung handle members having extensions for closing over the said flange, when turned to a horizontal position, the sheet-metal top B having a dome top, provided with a discharge, a nozzle adjustably connected to said discharge, said member B also having a horizontal flange $b$, adapted to seat upon the flange $a$, and having notches for interlocking with the lips of the said flange $a$, all being arranged substantially as shown and for the purposes described.

FREDRICK MacFARLAND.

Witnesses:
JOHN LONNBERG,
F. A. BUENK.